United States Patent Office 3,547,857
Patented Dec. 15, 1970

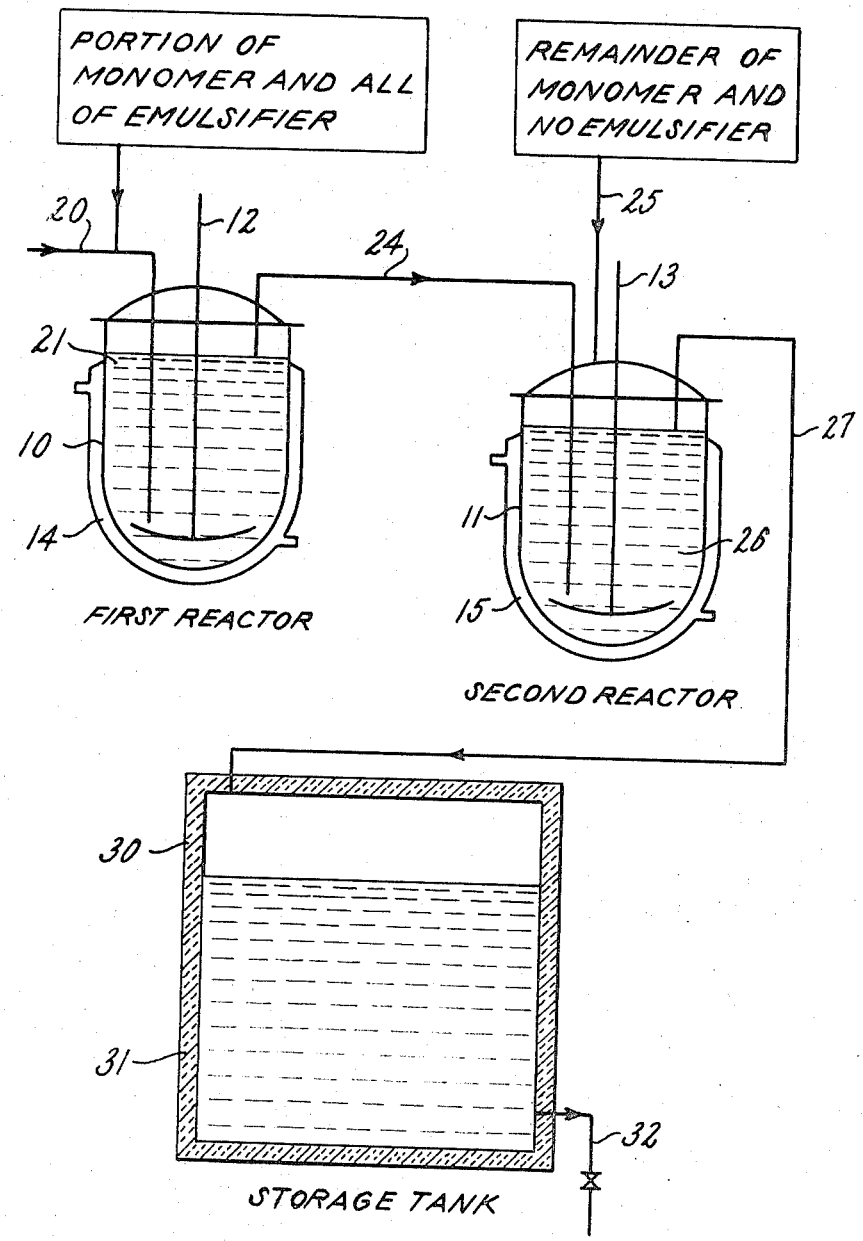

3,547,857
CONTINUOUS EMULSION POLYMERIZATION OF STYRENE AND ACRYLONITRILE BY ADDITION OF MONOMERS IN PLURAL STAGES WITH ALL OF EMULSIFIER ADDED IN FIRST STAGE

Allan G. Murray, Naugatuck, Conn., assignor to Uniroyal, Inc., New York, N.Y., a corporation of New Jersey
Filed Oct. 16, 1967, Ser. No. 675,399
Int. Cl. C08f 15/04, 15/22
U.S. Cl. 260—85.5      4 Claims

ABSTRACT OF THE DISCLOSURE

Continuous aqueous emulsion polymerization is carried out in two or more large volume reactors connected in series. The feed of monomers (e.g., styrene and acrylonitrile) is split between the first and second or subsequent reactors (e.g., 60/40) with the result that the process can be operated for extended periods of time without formation of coagulum in the reactors or transfer lines. All of the emulsifying agent is added in the first stage, and no additional emulsifyer is added in subsequent stages.

BACKGROUND OF THE INVENTION

Field of the invention

The invention relates to a continuous process for carrying out an aqueous emulsion polymerization in a series of large-volume reactors through which a stream of aqueous emulsion polymerization reaction mixture is passed continuously.

Description of the prior art

Continuous polymerization processes have previously been known. These processes usually are carried out in a long tube-like apparatus, a large vessel with continuous draw off and recirculation of the unpolymerized material, or a series of reaction vessels. The invention is directed to continuous aqueous emulsion polymerization carried out in a plurality of large-volume reactors connected in series, operated in such manner that polymerization mixture ingredients are fed continuously to the first reactor; after a definite time of dwell in the first reactor the material is transferred continuously to a second reactor a rate equal to the rate of introduction of material to the first reactor; after substantial completion of the polymerization in the last reactor, a product stream of polymer latex is withdrawn from the last reactor, at a rate equal to the rate of introduction of material thereto. Unfortunately, it is found that after a relatively short period of conventional operation of a process of this kind, coagulum begins to form on the walls of the reactors, interfering with the heat transfer necessary to maintain the reaction mixture at a desired polymerization temperature, and coagulum forms in the transfer pipe line connecting the vessels, plugging the line and necessitating shut-down for cleaning and a new start-up.

In U.S. Pat. 2,872,438, Carroll et al., Feb. 3, 1959, there is disclosed a continuous emulsion polymerization process for the production of high-solids latex involving the use of a polymer initiation zone ahead of the main reactor; in the polymer initiation zone a low degree of polymerization is effected to produce polymer particle nuclei which are then introduced into the reactor where the bulk of the polymerization takes place in the presence of polymer particles already formed. U.S. Pat. 2,475,016, de Nie, July 5, 1949, also discloses a continuous emulsion polymerization process. The present invention is directed to a process which affords better control of the polymerization process while forestalling in an economical manner undesirable tendency to formation of coagulum in the reactors, and enables relatively high production of polymer from reaction vessels of given size.

SUMMARY OF THE INVENTION

The basic continuous aqueous emulsion polymerization method, upon which the present invention is an improvement, may be described as involving feeding continuously at a definite rate, emulsion polymerization ingredients comprising monomeric material, water, emulsifying agent and catalyst, to a first reactor wherein the material is retained for a definite time of dwell while partial polymerization take place. The mixture is continuously withdrawn from the first reactor, at a rate equal to the rate at which material is fed to the first reactor, and introduced to a subsequent reactor where the polymerization is further advanced to a desired degree of completion. A product stream of resulting polymer latex is withdrawn continuously from the subsequent reactor at a rate equal to the rate of introduction of material to the subsequent reactor. In this way a constant volume of material is maintained in each reactor; the mixture in each reactor is continuously agitated, and maintained at a substantially constant desired polymerization temperature by circulating cooling water (it will be understood that the emulsion polymerization reaction is exothermic) through jackets provided on the reactors for this purpose. The improvement to which the invention is particularly directed involves introducing only a portion of the monomers to be polymerized to the first reactor along with the other emulsion polymerization ingredients, and introducing the remainder of the monomers to be polymerized to a subsequent reactor. It is found that by splitting the monomer feed between the first and subsequent reactors in this manner it is surprisingly possible to continue operation of the process for prolonged periods of time without formation of undesirable coagulum on the walls of the reactors or in the transfer pipe line connecting the two reactors.

BRIEF DESCRIPTION OF THE DRAWING

In the accompanying drawing, the single figure represents, in diagrammatic fashion, an arrangement of apparatus suitable for carrying out the invention.

DESCRIPTION OF PREFERRED EMBODIMENTS

Referring to the drawing, the process may be carried out in two or more conventional glass-lined steel vessels 10, 11, which may be of the same volume, equipped with agitators 12, 13 and jackets 14, 15 for the circulation of a cooling medium for removal of heat. It will be understood that the arrangement may include the usual conventional valves, metering pumps or other pumps, flow measuring devices and flow control devices, temperature measurement and control devices, and like conventional accessory items of equipment, which have been omitted from the diagrammatic showing of the drawing for simplicity. Polymerization ingredients comprising a portion of the monomers, water, catalyst, emulsifier, molecular weight regulator if desired, and any other desired polymerization ingredients, may be introduced to the first reactor 10 through a line 20. In operation, the first reactor 10 contains a definite volume 21 of the polymerization reaction mixture, which remains substantially constant throughout the process in a steady state of operation. An overflow line 24 may be provided, connecting the first reactor 10 to the second reactor 11 in such manner that the reaction mixture overflows from the first reactor, at a rate equal to the rate of introduction of material to the first reactor, ino the second reactor.

In accordance with the invention, there is also introduced to the second reactor 11, through a line 25, the remainder of the monomeric material to be polymerized. As indicated, for purposes of the invention only a portion of the monomeric material to be polymerized is introduced into the first reactor 10, the remainder being introduced in the second reactor 11.

A definite volume 26 of reaction mixture is maintained in the second reactor. A product stream of polymer latex overflows from the second reactor through an overflow product line 27, at the rate equal to the rate at which materials are introduced to the second reactor. The latex may then pass into a holding or storage tank 30 which may be provided with heat insulation 31, and suitably has a volume substantially greater than the volume of either of the reactors 10 or 11. The volume of the tank 30 is usually at least two times the volume of a reactor, and is preferably at least four times the volume of a reactor, suitably about ten times the volume of a reactor. The latex as introduced to the insulated tank still contains some unreacted monomers, and there still remains some residual activity in the polymerization catalyst, although the rate of polymerization at this point is quite low. Polymerization continues at a slow rate in the tank 30, but it is not necessary to cool this tank because the rate of evolution of heat of polymerization is very low, usually just sufficient to maintain the temperature of the latex in the tank at a desired elevated reaction temperature. Thus, the condition of operation in the tank 30 is essentially adiabatic, whereas in the reactors 10 and 11 an essentially isothermal condition was maintained by regulating the amount of cooling applied in the jackets 14, 15. From time to time (or continuously if desired) the final latex product may be withdrawn from the tank 30 through a line 32.

It will be understood that the latex product withdrawn from the tank 30 may be treated and processed in the conventional manner, that is, shortstops, stabilizers, antioxidants or the like may be added. Any unreacted monomers may be stripped for recovery and recycling if desired. The latex may be coagulated by conventional methods if it is desired to recover the polymer in dry, solid form, or if desired the latex may be utilized as such (e.g., for blending with latex of a different polymer, to make a desired blend).

Each reactor 10, 11 is a large-volume vessel in the sense that the volume of reaction mixture contained therein is sufficiently larger than the volumetric rate of flow of material into or out of the vessel to provide a desired hold-up time or reaction time in the vessel, so that the polymerization advances to a desired extent in the vessel, at the particular temperaure of operation. The reactors are normally operated not quite completely full (e.g., 90% full).

The principal object or advantage of the invention, is, as indicated, the ability to operate the system continuously for a prolonged period of time without encountering difficulties due to formation of coagulum in the reactors or in the connecting lines. Such coagulum forming on the interior surfaces of the reactors interferes with proper heat transfer and makes proper temperature control difficult. Furthermore, build-up of coagulum in the transfer line 24 would within a relatively short time block the line and make it necessary to shut down operations. By splitting the monomer feed, so that only a portion of the monomer is introduced to the first reactor along with the other ingredients of the polymerization recipe, while the remainder of the monomer is withheld and introduced only in the second reactor, it is surprisingly found that the process can be operated for greatly prolonged periods of time without undue development of coagulum. It is believed that undesired coagulum is formed when the polymer particles in the aqueous emulsion become excessively large. It is believed that collisions occurring between excessively large particles lead to formation of larger clumps of polymer which separate out of the dispersion and deposit on the walls of the reactor or in the lines. It is believed that by withholding a portion of the monomer from the first reactor in accordance with the invention, the reduced amount of monomer that is charged in the first reactor (along with the normal amount of emulsifying agent for the total monomers to be charged) forms more numerous particles, and particles of such smaller size, than would be formed if the total amount of monomer were charged to the first reactor (along with the same quantity of emulsifying agent). Because many more particles than usual are thus formed and because these particles are much smaller than usual, there is less tendency for very large particles to be formed toward the later stages of the polymerization. Thus, even though the polymerization of the additional monomer charged in the second reactor takes place largely on the particles that were formed in the first reactor, with consequent growth of the particles to a larger size, nevertheless, since the particles were unusually small to begin with, such growth does not produce substantial numbers of particles of excessive size, such as would lead to undesired instability in the latex. Other polymerization ingredients, such as polymerization modifier or regulator, and, if desired, additional polymerization catalyst, may be introduced to the second reactor along with the additional portion of monomer. However, it is neither necessary nor desirable to add additional emulsifying agent in the second reactor, since such additional emulsifying agent, aside from representing an unnecessary expense, would be undesirable from the standpoint of making more difficult the eventual coagulation and recovery of the polymer. Accordingly, the typical practice of the invention involves charging the total quantity of emulsifying agent to be used, this quantity being the normal quantity suitable for the total charge of monomers to be employed, to the first reactor.

Since the normal or usual quantity of emulsifying agent (for the total amount of monomers to be polymerized) is charged to the first reactor, along with a reduced quantity of the monomer, that is, less than the total quantity of monomer to be polymerized, it will be manifest that the reaction mixture in the first reactor actually contains a higher concentration of emulsifying agent, with respect to the amount of monomer present, than is present in the entire final reaction mixture in the second reactor when all of the monomer has been charged. This relatively high concentration of emulsifying agent, with respect to the quantity of monomer present, in the first reaction mixture, results in the formation of more numerous and smaller micelles, and consequently more numerous and smaller polymer particles, than would be produced in conventional practice with the same amount of emulsifying agent and all of the monomer to be polymerized present. The smaller the portion of the total quantity of monomer to be polymerized that is charged to the first reactor, the smaller the polymer particles that will be formed in the first reactor. Thus, if as little as 10% of the monomer is withheld from the feed to the first reactor, then the remaining 90% of the monomer, charged to the first reactor, will form proportionately smaller and more numerous micelles and polymer particles, and there will accordingly be a reduction in the tendency for the particles to grow to excessively large size (with accompanying undesirable instability and formation of coagulum). However, it is preferable to withhold a larger proportion of the monomer from the first reactor, say at least about 25%, in which case the micelles and polymer particles formed in the first reactor are even smaller, and there is even less tendency for undesired coagulum to form. At the other end of the scale, a major proportion of the monomer may be withheld from the first reactor, say up to 90% of the total quantity of monomer to be polymerized, although ordinarily there is no necessity to withhold more than about 60% of the monomer from the first reactor. Thus, although from 10% to 90% of the total monomer charged may be introduced in the first reactor, it is preferred to introduce from 40% to 75% of the total monomer in the first reactor, the remainder of course being charged to the second reactor, as described.

The invention is applicable to the continuous emulsion polymerization of any conventional monomers capable of being polymerized in aqueous emulsion by the action of conventional aqueous emulsion polymerization catalyst. Such monomers include the vinylidene monomers containing the ethylenically unsaturated grouping $CH_2=C<$ and, in most cases, have at least one of the disconnected valence bonds attached to an electronegative group, that is, a group which increases the polar characteristics of the molecule such as a chlorine group or an organic group containing a double or triple bond such as vinyl, phenyl, cyano, carboxy or the like. Particular mention may be made of the vinyl monomers, e.g., styrene (including substituted forms thereof or homologues thereof such as dichlorostyrene or alphamethylstyrene), acrylonitrile, methacrylonitrile, or similar acrylic-type compounds including acrylic or methacrylic acid or esters (e.g., methyl methacrylate, ethyl acrylate, etc.), vinyl chloride, vinyl acetate, vinylidene chloride, or monomers with more than one ethylenic double bond, such as butadiene, isoprene, and similar conjugated diolefins. The invention is of course applicable not only to the production of homopolymers of a single such monomer, but is also applicable to the production of copolymers from two or more such monomers, whether resinous copolymers as in the case of styrene-acrylonitrile copolymers, or rubbery copolymers as in the case of butadiene-styrene copolymers, butadiene-acrylonitrile copolymers, or such rubbery homopolymers as polybutadiene or polyisoprene. For a more comprehensive listing of suitable monomers, reference may be had to such textbooks as "Synthetic Rubber," by Whitby, G. S., 1954; "Vinyl and Related Polymers," by Schildknecht, 1952; "Emulsion Polymerization," by Bovey, F. A., et al., 1955, or such patents as the above-cited Carroll et al. Pat. 2,872,438, or de Nie 2,475,016.

As in conventional practice, the invention contemplates the provision of a reaction mixture comprising water, the monomer to be polymerized, and emulsifying agent, and a polymerization catalyst. Any suitable conventional emulsifying agent, capable of forming an emulsion of the monomer in the water when the mixture is agitated, may be employed. Frequently the emulsifying agent is a soap (sodium or potassium salt of a fatty acid); other emulsifying agents may be used, such as non-ionic emulsifying agents, salts of alkyl aromatic sulfonic acids, alkyl sulfates, and the like, rosin acid soaps, mixtures of fatty acid and rosin acid soaps, ammonium salts, etc. (see above citations).

Similarly, any conventional catalyst suitable for aqueous emulsion polymerization may be employed, such as those of the peroxide type (whether an organic peroxide such as benzoyl peroxide, or an organic peroxide such as potassium persulfate), or other free-radical types such as the azo type of polymerization catalyst [e.g., alpha, alpha'-azobis(isobutyronitrile)]. If desired, the redox type of polymerization catalyst system may be employed, particularly if the polymerization is carried at low temperature. If desired, various other modifying ingredients may be present, such as conventional polymerization regulators, including tertiary alkyl mercaptans. The ingredients of the emulsion polymerization reaction mixture may be employed in conventional overall proportions.

The reaction conditions employed may be the same as in conventional practice. Ordinarily the emulsion polymerization is carried out at elevated temperature (except, of course, in the case of the "cold" type of polymerization carried out at, for example, 40° F., or 0° F., or less), and for most purposes the emulsion polymerization temperature will fall within the range of from about 100° F. to about 200° F. The reaction temperature maintained in the first reactor may be the same as the reaction temperature employed in the second reactor, although in practice it is frequently found advantageous to use a somewhat higher temperature (e.g., 5–10° F. higher) in the second reactor than in the first reactor, because the concentration of active catalyst in the second reactor is usually less than in the first reactor, and therefore a higher temperature is desirable to maintain a given rate of polymerization. As indicated previously, the polymerization is exothermic, and therefore a cooling medium is applied to the reactors to maintain the desired reaction temperature.

The time of dwell of the reaction mixture in the first reactor is sufficient to produce a relatively high degree of conversion of the monomers charged to the first reactor, usualy at least about 70% conversion, and preferably 80% conversion or higher. In the second reactor the time of dwell is sufficient to result in still higher conversion, usually over 90% conversion, and preferably at least about 95% conversion, of the total monomers charged. After a conversion of about 95% is reached, the polymerization thereafter proceeds relatively slowly, and relatively little heat is liberated. Therefore, if it is desired to advance the conversion to a level still higher than about 95%, this is most economically done in the large insulated holding tank 30, wherein substantially adiabatic conditions prevail and the mixture tends to maintain itself at a temperature sufficiently elevated for the polymerization to come to a desired degree of completion within a reasonable time (e.g., 1 to 10 hours) without any necessity for taking special measures for temperature control in the tank 30. Completing the polymerization in this manner in the separate tank 30 has the advantage of avoiding undesirable long hold-up times in the second reactor 11, that is, a desirably high through-put rate may be maintained in the second reactor 11 (as well as in the first reactor 10), thereby making for most efficient utilization of the reactors 10 and 11, which are relatively expensive items of equipment, in comparison to the simple tank 30.

In operation of the present process, it is possible to take full advantage of the cooling capacity of the reactors because of the manner in which the heat load (exothermic heat of polymerization) is distributed between the reactors by splitting the monomer feed between the reactors.

As stated previously, the amount of emulsifying agent charged to the first reactor in the present process is the normal or conventional amount of emulsifying agent with respect to the total monomers to be polymerized, although with respect to the portion of the monomers actually fed to the first reactor, the amount of emulsifying agent is in excess of what would be considered the normal amount, for the quantity of monomer present in the first reactor. Thus, the normal amount of emulsifying agent, per 100 parts of total monomers to be polymerized, would ordinarily be within the range of from about 0.5 to 7.0 parts of emulsifying agent, by weight. This normal amount of emulsifying agent, when combined with the reduced portion of monomers charged to the first reactor, results, as indicated previously, in a larger number of micelles or polymer particles, and smaller micelles or polymer particles, than would be obtained if the total quantity of monomers to be polymerized were charged to the first reactor along with the same amount of emulsifying agent.

The fact that the conversion is carried to a relatively high value (usually at least about 80%) in the first reactor, in contrast to the low conversion obtained in the polymer initiation zone in Carroll et al. 2,872,438, makes it possible to control the reaction more readily, since the rate of polymerization is very rapid in the early stages, and minor variations in the feed, presence or absence of impurities in the feed, unavoidable variations in the cooling medium, and similar difficult-to-control process variables, would result in relatively large variations from time to time at the low 12% conversion level of Carroll et al. In Carroll et al. the ratio of soap to monomer in the charge to the initiation zone is no higher than the ratio of soap to monomer in the charge to the reactor. Therefore, Carroll et al. are not making more particles than normal or smaller particles than normal in the initiation zone, since they do not have a higher than normal ratio of soap to monomer in that zone, unlike the present invention which uses all of the soap with only part of the monomer in the first reactor, thus forming more particles than would be the case if the soap-to-monomer ratio were "normal" in the first reactor. Similarly, the invention is distinct from de Nie 2,475,016, who introduces a more concentrated solution of emulsifying agent to reaction zones subsequent to the first reaction zone.

The following example, in which all quantities are expressed by weight, will serve to illustrate the practice of the invention in more detail.

EXAMPLE

This example demonstrates the use of the invention for the production of styrene-acrylonitrile copolymer resin. The monomer feed is split 60/40, by weight, between the first reactor and the second reactor. To start up the process, a batch polymerization is first made in conventional manner in each of the reactors, without any transfer of material from one reactor to the other. The emulsion polymerization recipe in the first reactor 10 is as follows:

| Material— | Parts |
|---|---|
| Water | 120 |
| Sodium rosin soap | 2.0 |
| Potassium persulfate | 0.3 |
| Styrene | 42 |
| Acrylonitrile | 18 |
| Mixed tertiary mercaptans | 0.3 |

(The mixed tertiary mercaptans may comprise, for example, 60% dodecyl, 20% tetradecyl, and 20% hexadecyl mercaptan; commercially available material known as "MTM-4".) In this case, the desired polymerization temperature is 150° F., and the mixture is readily brought up to this temperature by using hot water for the charge.

The emulsion polymerization recipe in the starting batch for the second reactor 11 is as follows:

| Material— | Parts |
|---|---|
| Water | 120 |
| Sodium rosin soap | 2.0 |
| Potassium persulfate | 0.3 |
| Acrylonitrile | 30 |
| Styrene | 70 |
| Mixed tertiary mercaptans | 0.5 |

It will be noted that the initial batch for the first reactor contained only 60% as much monomers as the initiator batch for the second reactor, that is, the starting batch for the first reactor represents the composition at which it is desired to operate the first reactor, whereas the starting batch for the second reactor represents the composition desired for the final polymerization reaction mixture, containing all of the monomers to be polymerized. In this case it is desired to operate the second polymerization reactor at a temperature of 155° F., and suitably heated water is used for the initial charge to this reactor to bring the mixture to this desired reaction temperature. When the initial batches in the reactors reach a conversion of about 80%, continuous operation may be begun by charging continuously to the first reactor 10 a polymerization recipe the same as the recipe described above for the initial charge to the first reactor (for example at the rate of about 12,782 pounds per hour for a 3750 gallon reactor). The reaction mixture immediately begins to overflow from the first reactor into the second reactor. At the same time an additional charge of materials is fed continuously to the second reactor 11 as follows (for example at a rate of about 2800 pounds per hour for a 3750 gallon reactor):

| Material— | Parts |
|---|---|
| Styrene | 28 |
| Acrylonitrile | 12 |
| Mixed tertiary mercaptans | 0.2 |

It will be noted that no soap is included in the additional materials supplied to the second reactor, and it will be noted that the feed of monomers to the second reactor amounts to 40% of the total monomers, whereas the feed to the first reactor amounts to 60% of the total monomers.

In a typical steady state operating condition, the time of dwell of the reactants in the first reactor 10 under the conditions described is about 2½ hours, and the conversion in that reactor is 92%. The time of dwell in the second reactor 11 is about 2 hours and the conversion is about 95%, based on the total monomers charged. The reaction mixture overflows continuously from the second reactor into the insulated tank 30. The material in the tank 30 tends to maintain itself at a temperature about 155° F., and after a period of about 4 hours dwell in the insulated tank the conversion has advanced slightly further to a final value of about 97%. The resulting polymer latex product may be held in the tank 30 or series of such tanks, until such time as it is desired to withdraw the product for any further processing or use that may be desired.

In typical operation according to the foregoing example, it is found that the maximum particle size of the polymer particles in the final latex is of the order of about 6000 angstroms. It is found that the process can be operated for indefinitely long periods of time, extending over a period of many days if desired, without any necessity for a shut-down to clean coagulum out of the reactors or connecting lines. In contrast, if the entire quantity of monomers is fed to the initial reactor (instead of being split 60/40 between the first and second reactors as described), it is found that the maximum particle size in the final latex exceeds 8000 angstroms, and the latex is consequently unstable; within a relatively short period of continuous operation (e.g., 20 hours) it may be found that a skin of coagulum is building up on the reactor walls, interfering with proper heat transfer and temperature control, and it will be found that the transfer lines tend to become plugged with coagulum, making it necessary to shut down the process for time-consuming and expensive cleaning of the equipment, followed by a fresh start-up.

It will be understood that the initial polymer particle size, in the start-up batch, is rather small (about 1300 to 2000 angstroms) and the particles initially are of relatively uniform size. Continuous feeding of monomers tends to result in particle size growth for two reasons: (1) The large amount of polymer in the reactor tends to absorb the emulsifier, thus reducing the initiation of new particles and promoting the growth of existing particles. The splitting of monomer feed in accordance with the invention reduces the amount of polymer in the first reactor thereby reducing the quantity of emulsifier absorbed and permitting free emulsifier to be present for initiation of new particles; (2) Short circuiting of the material in the vessel results in a wide variation of residence times for individual particles. Some particles remain in the reactor as long as the process is run, and some pass directly through, the balance having residence times between these extremes. The particles remaining in the reactor for the longest times will of course grow to the largest sizes while the particles moving out rapidly will remain small. The invention minimizes the possibilities of long residence time particles becoming excessively large and causing coagulation.

Having thus described my invention, what I claim and desire to protect by Letters Patent is:

1. In a method for the continuous polymerization, in aqueous emulsion, of monomeric material polymerizable in aqueous emulsion wherein:
   (a) an emulsion polymerization mixture comprising said monomeric material, water, a definite quantity of emulsifying agent and aqueous emulsion polymerization catalyst, is fed continuously to a first reactor,
   (b) the mixture is retained in said first reactor for a definite time of dwell while partial polymerization takes place,
(c) the mixture is withdrawn continuously at a rate equal to the rate of said feed, from the first reactor and introduced to a subsequent reactor wherein the polymerization is advanced to a desired degree of completion, and
(d) a product stream of resulting polymer latex is withdrawn continuously from said subsequent reactor at a rate equal to the rate of introduction of material thereto, the improvement comprising:
(e) continuously introducing only a portion of the monomeric material to be polymerized, along with the total quantity of emulsifying agent to be employed, to the first reactor, and introducing the remainder of the monomeric material to be polymerized, without any additional emulsifying agent, to the subsequent reactor, the said monomeric material being a mixture of styrene and acrylonitrile.

2. A method as claimed in claim 1 from 10 to 90% of the monomeric material to be polymerized is introduced to the first reactor, and the conversion in the first reactor is at least 70%.

3. A method as in claim 1 in which from 40 to 75% of the monomeric material to be polymerized is introduced to the first reactor and the conversion in the first reactor is at least about 80%.

4. A method as in claim 3, in which the conversion in the subsequent reactor is at least about 95%, and the polymerization is thereafter advanced, under adiabatic conditions, to a value of at least about 97%.

References Cited

UNITED STATES PATENTS

| | | | |
|---|---|---|---|
| 2,475,016 | 7/1949 | de Nie | 260—85.5HC |
| 2,793,199 | 5/1957 | Kurtz | 260—85.5Orig |
| 2,872,438 | 2/1959 | Carroll et al. | 260—85.5P |
| 3,252,950 | 5/1966 | Terenzi et al. | 260—85.5P |
| 3,334,081 | 8/1967 | Madgwick et al. | 260—85.5HC |

HARRY WONG, JR., Primary Examiner

U.S. Cl. X.R.

260—29.6, 90, 82.3, 83.7, 88.7, 89.1, 89.5, 91.5, 91.7, 92.8, 93.5, 93.7, 94.2